United States Patent [19]

Onken et al.

[11] 4,450,828
[45] May 29, 1984

[54] TRUCK HAVING EQUIPMENT FOR ON-SITE HEATING AND COLLECTING USED GREASE FROM CONTAINERS

[76] Inventors: Donald R. Onken, Box 72, Easton, Ill. 62633; Robert L. Griffin, 509 Laurel Dr., Mason City, Ill. 62664

[21] Appl. No.: 400,123

[22] Filed: Jul. 20, 1982

[51] Int. Cl.³ .......................... B60H 1/02; B60H 1/22
[52] U.S. Cl. .............................. 126/343.5 A; 414/409; 414/406; 126/19.5
[58] Field of Search ............... 432/210, 211, 208, 262, 432/241, 156, 157, 160, 197; 414/406, 409, 424; 126/343.5 A, 19.5

[56] References Cited

U.S. PATENT DOCUMENTS

| 100,259 | 3/1870 | Chichester | 414/424 |
| 834,944 | 11/1906 | Stevens | 126/343.5 A |
| 3,499,678 | 3/1970 | Richler | 126/343.5 A |
| 3,732,063 | 5/1973 | Corsaro et al. | 432/197 |
| 3,837,512 | 9/1974 | Brown | 414/406 |
| 3,901,255 | 8/1975 | Pettit | 414/409 |
| 4,167,391 | 7/1979 | Parker | 126/343.5 A |
| 4,237,857 | 12/1980 | Sharp, Sr. | 126/343.5 A |

FOREIGN PATENT DOCUMENTS

| 2324730 | 12/1974 | Fed. Rep. of Germany | 414/410 |
| 2630440 | 1/1978 | Fed. Rep. of Germany | 414/409 |
| 592403 | 9/1947 | United Kingdom | 414/410 |

Primary Examiner—Henry C. Yuen
Attorney, Agent, or Firm—Edwin E. Greigg

[57] ABSTRACT

A hinged-cover tank truck, for on-site collecting of used deep-frying grease, has a hydraulically powered winch for lifting, swinging and dumping the semi-solid grease from large containers to be emptied and then left at the collection site. A hot-water bath is mounted on the truck so that the container can be immersed therein long enough to melt the periphery of the semi-solid grease mass to facilitating its dumping.

5 Claims, 7 Drawing Figures

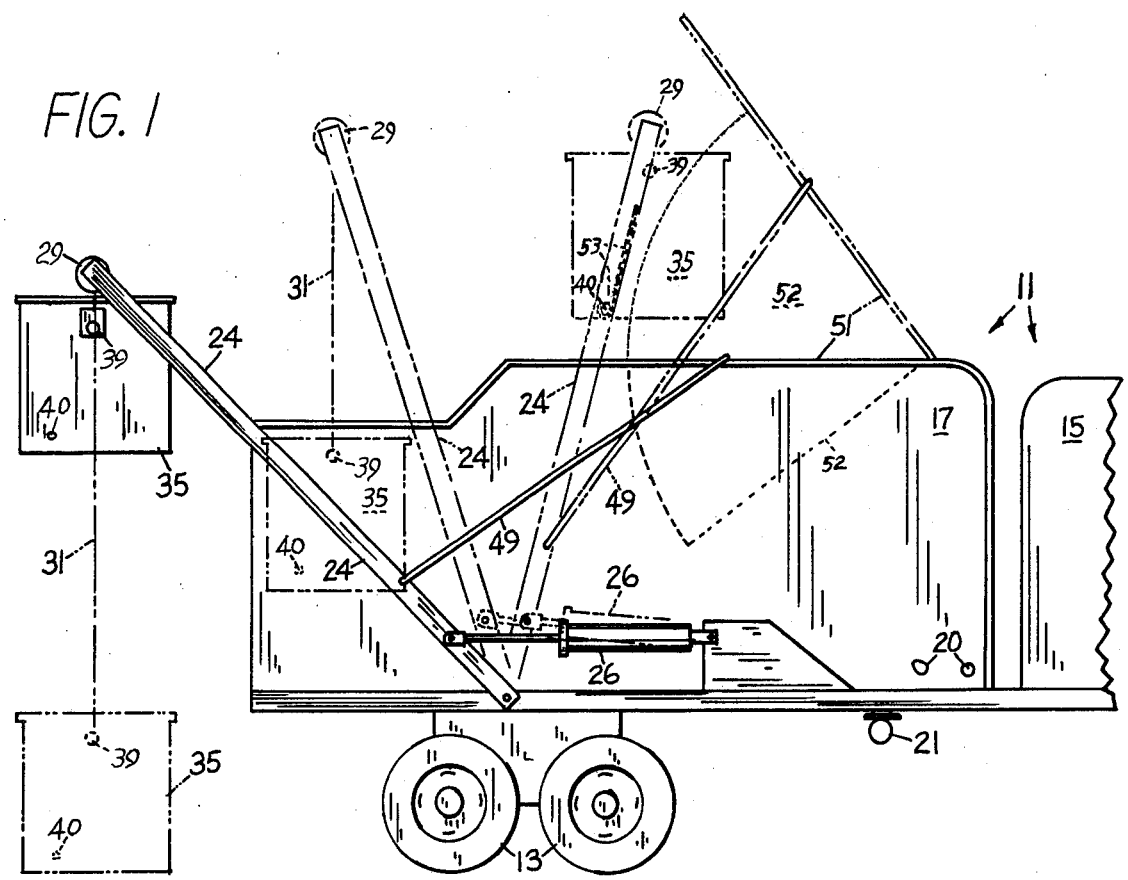
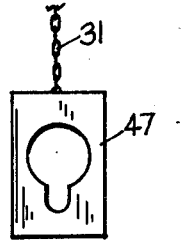
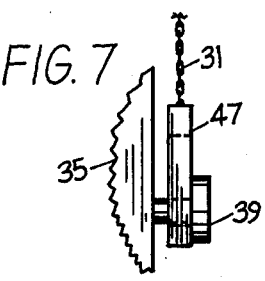
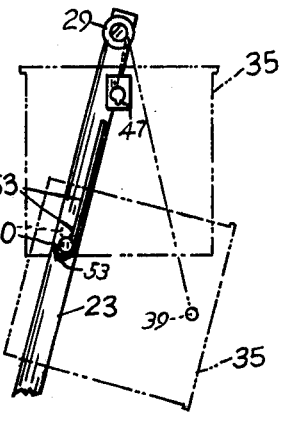
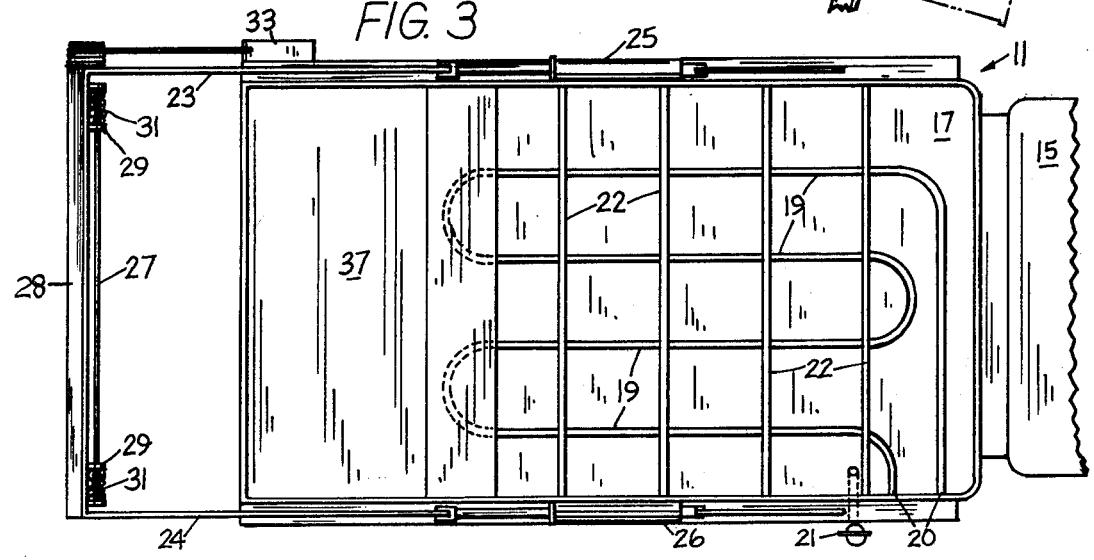

TRUCK HAVING EQUIPMENT FOR ON-SITE HEATING AND COLLECTING USED GREASE FROM CONTAINERS

BACKGROUND AND OBJECT OF THE INVENTION

Heretofore it has been the custom of frequently (e.g. weekly) picking-up from restaurants barrels of used deep-frying grease and leaving returned empty barrels. It is the object of this invention to provide a truck having a large grease-holding tank and accessory apparatus for (1) picking-up large grease containers, (2) immersing each container in a heating bath to loosen the semi-solid grease from the container walls, and (3) dumping the grease into the opened tank, so that the containers can be emptied at the restaurant and left there. Thus less frequent (e.g. monthly) pick-up trips will be needed.

BRIEF DESCRIPTIONS OF THE DRAWING FIGURES

FIG. 1 is a side elevational view of a preferred embodiment of the invention.

FIG. 2 is an enlarged fragmentary view of the upper central portion of FIG. 1 showing details of the container-dumping operation.

FIG. 3 is a plan view of the showing of FIG. 1 with the truck cover removed.

FIG. 6 is a front elevational view of a detachable connector for coupling a chain to a container.

FIG. 7 is a side elevational view of the coupler of FIG. 6.

DETAILED DESCRIPTION

Figure 4:
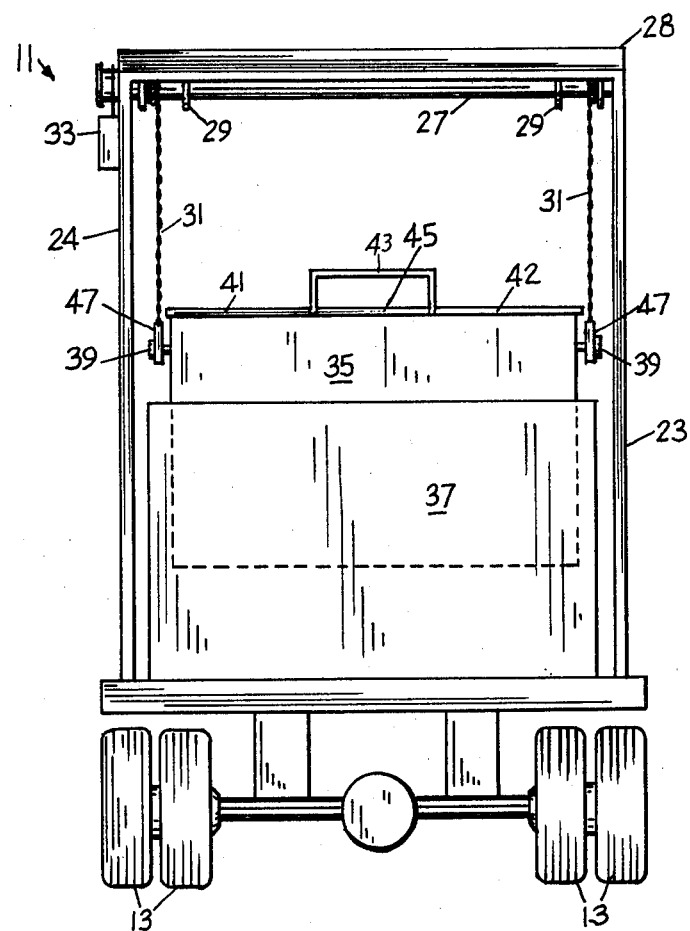
FIG. 4 is a rear elevational view of the truck.

With reference now to the drawings, the numeral 11 generally designates the truck, which has conventional wheels 13 and a cab 15 associated with a conventional engine (not shown). The cargo part 17 is a large tank for holding the dumped grease. In the bottom of the tank 17 there is shown a convoluted tube 19 by which steam can be fed through in-out openings 20 to melt the collected grease from drainage (at a warehouse) through a valved outlet coupler 21. Transverse bars 22 (FIG. 3) prevent lateral bulging of the tank walls.

The mechanism for lifting, immersing, and dumping the containers comprises a pair of lever arms 23 and 24 simultaneously swung by hydraulic cylinders 25 and 26. The upper ends of the arms 23 and 24 are bridged by a bar 28 and by a shaft 27 having winch spools 29 thereon for winding and unwinding cables or chains 31 thereon. The winch 29 is operated by a reversible hydraulic motor 33 of known construction.

Figure 5:
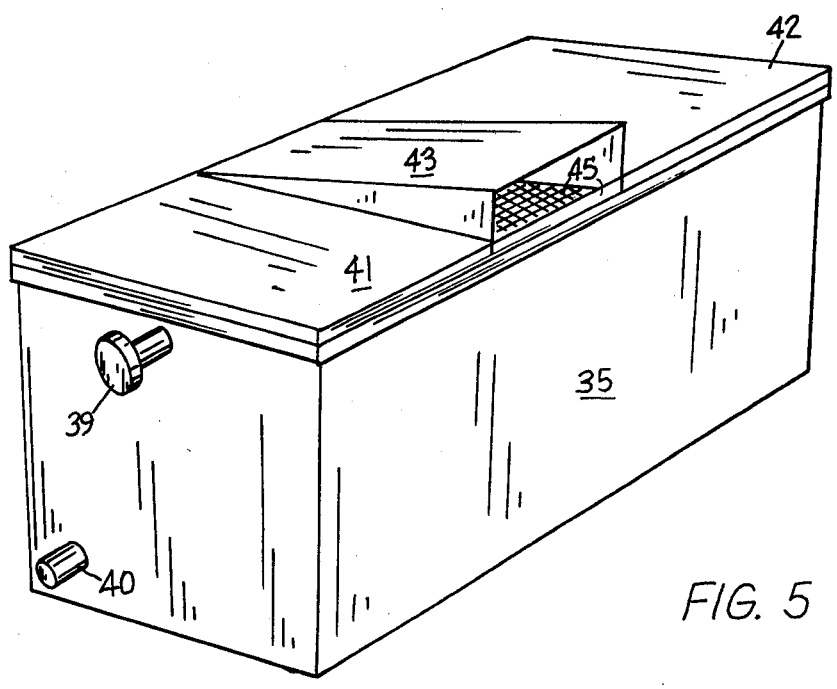
FIG. 5 is a perspective view of one of the on-site-emptying grease-containers.

The on-site left-there container 35 is of a size to equal several of the barrels previously employed. It has downwardly inwardly tapered sides to facilitate dumping the semi-solid grease block after its sides are heat-softened by immersion of the container in a hot-water-bath vat 37 (heated in known manner by an immersion electric heater or by hot-water or exhaust-gas coils, not shown). The container 35 has lift lugs 39 and dumping-tilting lugs 40. The cover for the container 35 has two end panels 41 and 42 (FIG. 5) and has a wedge-shaped sheet-material central panel 43 defining a grease-receiving tunnel-like structure which has a horizontal meshed strainer 45 attached thereto. In FIGS. 6 and 7 there is shown a quick-coupler device 47 having a key-hole opening therein to receive and hold the enlarged-headed lug 39 in known manner.

The lever arms 23 and 24 have connected medially thereto levers 49 which automatically lift the cover 51 and its anti-splash side panels 52 in preparation for the grease-dumping operation next described.

The grease-dumping operation is best illustrated in FIG. 1. Firstly, the container is sitting at ground level (left phantom). Secondly, it is winch-lifted to the full-line-shown position. Thirdly, it is lowered into the hot-water bath 37. Fourthly, it is again lifted and is swung to the last (right) position shown in FIG. 1. Fifthly, it is dumped (FIG. 2) by lowering the container 35, so that the lugs 40 enter J-shaped pockets 53, which are welded to the inner faces of the lift levers 23 and 24. After this, further lowering of the container 35 makes it pivot around said lugs 40 to dump its grease contents.

It should be noted that the grease container could be a plurality of heretofore-used barrels clamped together side-by-side by a device (not shown), which device would have the pins needed for effecting the lifting, the immersing and the dumping-tilting of the clamped-together barrels.

The invention having been described, what is claimed is:

1. A waste grease truck for on-site dump-collecting used, deep-fry grease dumped into a large vat-like grease container which comprises:

a chassis;

a large tank secured on said chassis, said tank including a large chamber having an openable top thereon for receiving grease dumped into said vat-like grease container and a small open-top chamber separated from said large chamber by a transverse partition, said small open-top chamber being larger than said vat-like grease container and adapted to receive water therein and for receiving and heating said vat-like grease container to loosen grease therein to enable pouring the grease therefrom into said large container chamber, means in said small chamber for heating water received therein to form a hot water bath, said large chamber including heating means therein for heating contents therein to facilitate drainage, a parallel pair of arms each pivotally secured at one end to said chassis on opposite sides of said large tank with each arm of said pair having a free end, a winch bar rigidly interconnecting, and journaled in, said free ends of said arms, said winch bar having winch spools affixed to its ends adjacent said arms, a reversible hydraulic motor for rotating said winch bar in opposite directions, cable-like elements coordinately windable on each of said winch spools for lifting and lowering said large vat-like grease container relative to said arms, coordinated hydraulic cylinders secured at one end to said chassis and at their opposite ends to said arms so as to swing a vat-like grease container supported by said arms to a desired position relative to said large tank, said openable top of said large chamber being operatively connected to said arms for automatic opening and closing in response to movement of said arms by said hydraulic cylinders, and means on said vat-like grease container and on said parallel arms which cooperate to dump the contents of said vat-like grease container into said large chamber, whereby said cable-like element ends are connected to opposite sides of said vat-like grease container for lifting said vat-like grease container, said arms are moved so that said vat-like grease container can be lowered into said small open top chamber in which the grease in said vat-like container is partially melted, then the vat-like grease container is lifted and the arms moved to a position so that the grease can be dumped into said large chamber by movement of the arms and tilting of the vat-like grease container by said means on said container and said arms that cooperate to dump the contents of said vat-like grease container.

2. A truck according to claim 1 wherein said grease container has somewhat sloping side walls to facilitate dumping.

3. A truck according to claim 1 wherein said hot-water bath includes an electric heater.

4. A truck according to claim 1 wherein said cooperating means for dumping grease from said vat-like grease container comprises low and off-center pins on the ends of said grease container and mating open-topped sockets on the inner surfaces of said arms.

5. A truck according to claim 4 wherein said arms have flanges for automatically guiding said off-center pins into said open-topped sockets as said grease containers are lowered from above said tank.

* * * * *